United States Patent

Gallo et al.

Patent Number: 6,136,735
Date of Patent: Oct. 24, 2000

[54] GLASS FIBRES FOR REINFORCING ORGANIC AND/OR INORGANIC MATERIALS

[75] Inventors: Marcelo Hernan Gallo, Buenos Aires, Argentina; Jan Van Genechten, PJ Best, Netherlands; Jean-Paul Bazin, Argenteuil, France; Sophie Creux, Sceaux, France; Pascal Fournier, Chambery, France

[73] Assignee: Vetrotex France S.A., Chambery, France

[21] Appl. No.: 09/284,976

[22] PCT Filed: Sep. 10, 1998

[86] PCT No.: PCT/FR98/01932

§ 371 Date: Sep. 2, 1999

§ 102(e) Date: Sep. 2, 1999

[87] PCT Pub. No.: WO99/12858

PCT Pub. Date: Mar. 18, 1999

[51] Int. Cl.⁷ ............ C03C 13/06; C03C 3/087
[52] U.S. Cl. ............ 501/36; 501/35; 501/70; 65/454; 65/459
[58] Field of Search ............ 501/35, 36, 70; 65/459, 454

[56] References Cited

U.S. PATENT DOCUMENTS

| | | |
|---|---|---|
| 3,095,311 | 6/1963 | Wranau et al. . |
| 4,199,338 | 4/1980 | Levecque et al. . |
| 4,542,106 | 9/1985 | Sproull . |
| 5,250,488 | 10/1993 | Thelohan et al. ............ 501/36 |
| 5,346,864 | 9/1994 | Maugendre et al. ............ 501/35 |
| 5,352,258 | 10/1994 | Degreve et al. . |
| 5,420,082 | 5/1995 | Maugendre et al. ............ 501/35 |
| 5,789,329 | 8/1998 | Eastes et al. ............ 501/36 |
| 5,910,461 | 6/1999 | Gasca et al. ............ 501/35 |
| 5,932,500 | 8/1999 | Jensen et al. ............ 501/36 |
| 5,962,354 | 10/1999 | Fyles et al. ............ 501/36 |
| 6,043,170 | 3/2000 | Steinkopf et al. ............ 501/36 |

FOREIGN PATENT DOCUMENTS

| | | |
|---|---|---|
| 419322A1 | 3/1991 | European Pat. Off. . |
| 26292248 | 12/1993 | France . |
| 85/02395 | 6/1985 | WIPO . |

OTHER PUBLICATIONS

Derwent Abstract 95–262260, Abstract of Russian Patent Spec. 2027687, Jan. 1995.

Primary Examiner—Karl Group
Attorney, Agent, or Firm—Oblon, Spivak, McClelland, Maier & Neustadt, P.C.

[57] ABSTRACT

The present invention relates to reinforcing glass yarns, the composition of which comprises the following constituents within the limits defined hereinbelow, expressed in percentages by weight:

| | |
|---|---|
| $SiO_2$ | 58 to 62% |
| $Al_2O_3$ | 10 to 16% |
| CaO | more than 18% |
| MgO | more than 1.5% |
| CaO + MgO | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | this composition furthermore comprising less than 1% of other constituent(s) and comprising more than 0.5% of at least one of the three components $F_2$, $B_2O_3$ and $Li_2O$.

These yarns have a composition providing an excellent compromise between its cost and its fiberizability.

10 Claims, No Drawings

GLASS FIBRES FOR REINFORCING ORGANIC AND/OR INORGANIC MATERIALS

The present invention relates to "reinforcing" glass yarns (or "fibres"), that is to say yarns which can be used for the reinforcement of organic and/or inorganic materials and which can be used as textile yarns, these yarns being susceptible to be obtained by the process which consists in mechanically drawing the streams of molten glass which flow out of orifices located in the base of a bushing which is generally heated by the Joule effect.

The present invention relates more specifically to glass yarns having a particularly advantageous novel composition.

The field of reinforcing glass yarns is a very special field in the glass industry. These yarns are produced from specific glass compositions, the glass used having to be able to be drawn in the form of filaments of few micrometers in diameter using the process defined above and having to allow the formation of continuous yarns suitable in particular for fulfilling their reinforcing function. The reinforcing glass yarns most commonly used are thus the yarns formed from glasses which derive from the 1170° C. eutectic of the $SiO_2$—$Al_2O_3$—$CaO$ ternary diagram, in particular the yarns called E-glass yarns, the archetype of which is described in U.S. Pat. No. 2,334,981 and U.S. Pat. No. 2,571,074. E-glass yarns have a composition essentially based on silica, alumina, lime and boric anhydride, the boric anhydride, present in amounts ranging in practice from 5 to 13% in the compositions of glasses termed "E-glass", replacing part of the silica, the E-glass yarns being furthermore characterized by a limited content of alkali metal oxides (essentially $Na_2O$ and/or $K_2O$).

Since the two patents mentioned, glasses comprising these constituents have formed the subject of numerous modifications whose purpose is to reduce emanations of products likely to pollute the atmosphere, to reduce the cost of the composition, by decreasing the content of the more expensive constituents, to improve the capability of these glasses to undergo fiberizing (fiberizing or forming corresponding to the operation of drawing the glass filaments from a bushing in the abovementioned process), especially by decreasing their viscosity at high temperatures as well as their tendency to devitrify, to improve such and such a particular property. Attempts have been made to reduce the cost of the compositions in particular, but these are generally to the detriment of their fiberizability, the processing of these glasses, in order to obtain reinforcing yarns, generally becoming more difficult or tricky, possibly requiring the existing fiberizing plants or working conditions to be modified and possibly incurring reductions in yield and an increase in the amount of scraps obtained, finally resulting in an increase in the overall production cost. The development of compositions which are much cheaper than the E-glass compositions but which can be fiberized without any difficulty, like the conventional E glass compositions (and which therefore have a lower overall production cost), therefore still remains to be achieved and is particularly desirable.

The subject of the present invention is thus yarns of a glass composition satisfying the above requirement, i.e. yarns of a glass composition (and of a production) which is as inexpensive as possible while at the same time maintaining a particularly good fiberizability.

These objectives are achieved by virtue of glass yarns whose composition represents one of the best possible compromises between its cost and its fiberizability, this composition essentially comprising the following constituents within the limits defined hereinbelow, expressed in percentages by weight:

| | |
|---|---|
| $SiO_2$ | 58 to 62% |
| $Al_2O_3$ | 10 to 16% |
| $CaO$ | more than 18% |
| $MgO$ | more than 1.5% |
| $CaO + MgO$ | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | this composition furthermore comprising less than 1% of other constituent(s) and comprising more than 0.5% of at least one of the three components $F_2$, $B_2O_3$ and $Li_2O$.

In particular, according to a preferred embodiment of the invention, the glass yarns have a composition essentially comprising the following constituents within the limits defined hereinbelow, expressed in percentages by weight:

| | |
|---|---|
| $SiO_2$ | 58 to 62% |
| $Al_2O_3$ | 10 to 16% |
| $CaO$ | more than 18% |
| $MgO$ | more than 1.5% |
| $CaO + MgO$ | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | this composition furthermore comprising less than 1% of other constituent(s) and comprising more than 0.5% of $F_2$. In this embodiment of the invention, the composition may advantageously contain no $B_2O_3$ (cost benefit and advantage in terms of smoke treatment) or may comprise it, especially as (or by way of) impurity, in amounts ranging from 0 to 0.5% by weight. In a variant, this composition may also comprise between 0.5 and 2% of $B_2O_3$. Likewise, this composition may contain no $Li_2O$ (especially a cost benefit) or may comprise it in amounts ranging from 0 to 0.5% by weight or in amounts of between 0.5 and 2% by weight.

According to another embodiment of the invention, the glass yarns have a composition essentially comprising the following constituents within the limits defined hereinbelow, expressed in percentages by weight:

| | |
|---|---|
| $SiO_2$ | 58 to 62% |
| $Al_2O_3$ | 10 to 16% |
| $CaO$ | more than 18% |
| $MgO$ | more than 1.5% |
| $CaO + MgO$ | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | this composition furthermore comprising less than 1% of other constituent(s) and comprising more than 0.5% of $B_2O_3$. In this embodiment of the invention, the composition may contain no $F_2$ (an advantage in terms of smoke treatment) or may comprise it, especially as impurity, in amounts ranging from 0 to 0.5% by weight. In a variant, this composition may also comprise between 0.5 and 2% of $F_2$. Likewise, this composition may contain no $Li_2O$ or may contain it in amounts ranging from 0 to 0.5% by weight or in amounts of between 0.5 and 2% by weight.

In a third embodiment of the invention, the glass yarns have a composition as defined according to the invention, this composition comprising more than 0.5% of $Li_2O$. In this embodiment, the composition may contain no $F_2$ or may contain it as impurity, especially in amounts ranging from 0 to 0.5% by weight or in amounts of between 0.5 and 2% by weight. Likewise, this composition may contain no $B_2O_3$ or may comprise it in amounts ranging from 0 to 0.5% by weight or in amounts of between 0.5 and 2% by weight.

Silica is one of the oxides which forms the network of the glasses according to the invention and plays an essential role in their stability. Within the context of the limits defined above, when the amount of this constituent is less than 58%, the viscosity of the glass becomes too low and the phenomenon of devitrification occurs too easily during fiberizing; when its amount exceeds 62%, the glass becomes very viscous and difficult to melt. Preferably, the silica content is greater than 58% (and particularly preferably it is greater than 58.5%) and is generally between 59 and 62%.

Alumina also constitutes a network former for the glasses according to the invention and plays a very important role with regard to the strength of these glasses. Within the context of the limits defined according to the invention, decreasing the amount of this oxide below 10% results in the glass undergoing a substantial increase in hydrolytic attack, whereas increasing the amount of this oxide above 16% results in risks of devitrification and an increase in the viscosity.

In the composition according to the invention, lime and magnesia make it possible to adjust the viscosity and to control the devitrification of the glasses according to the invention. Within the context of the limits defined for the preceding oxides, good fiberizability is obtained with CaO and MgO contents which are greater than 18 and 1.5%, respectively, and by maintaining the sum of the contents of these alkaline-earth metal oxides below 28% (preferably below 27%), the devitrification phenomenon becoming more pronounced to an unacceptable extent above 28%. The sum of the CaO and MgO contents is generally greater than 21% and preferably greater than 23%, the viscosity of the glasses generally becoming too high at lower contents. Preferably, the CaO and MgO contents do not exceed 26 and 10%, respectively, so as to avoid specific (in wollastonite and diopside, respectively) devitrification problems susceptible to arise with higher contents of each of these constituents. Moreover, the minimum CaO and MgO contents are 18 and 1.5%, respectively, for the ease of fiberizing reasons given above, as well as for economic and practical reasons. In most of the cases according to the invention, the MgO content is rathermore between 2 and 4%, or even between 2 and 3.5%, and the CaO content is rathermore between 20 and 25%.

$Na_2O$ and $K_2O$ may be introduced into the compositions of the glass yarns according to the invention in order to further limit devitrification and on occasion to reduce the viscosity of the glass. The content of the alkali metal oxides $Na_2O+K_2O+Li_2O$ must, however, remain less than 2% in order to avoid an increase in the electrical conductivity unacceptable in the case of electronic applications and to avoid a detrimental decrease in the hydrolytic resistance of the glass. The composition may contain only one alkali metal oxide (from $Na_2O$, $K_2O$ and $Li_2O$) or may contain a combination of at least two alkali metal oxides. When the composition according to the invention comprises less than 0.5% of $F_2$ and less than 0.5% of $B_2O_3$, it necessarily comprises more than 0.5% of $Li_2O$, in accordance with the definition of the invention, and may also comprise, optionally, $Na_2O$ and/or $K_2O$. When the composition according to the invention comprises more than 0.5% of $F_2$ and/or more than 0.5% of $B_2O_3$, it may, for example, advantageously comprise from 0.5 to 1% of $Na_2O$ and optionally $K_2O$ (for example from 0 to 0.5%) and/or $Li_2O$.

In the composition according to the invention, $TiO_2$ is used to fluidify the composition and plays the role of a crystallization retarder. It may be present as impurity (its content in the composition is then from 0 to 0.5%) or may have been intentionally added to the composition. However, its intentional addition to the composition requires the use of very specific unusual raw materials and increases the cost of the composition. Within the context of the present invention, its presence is advantageous only in the case of a content of less than 1.5%, and preferably less than 1%.

Iron oxides (expressed in the form of $Fe_2O_3$) are generally present as impurities in the composition according to the invention. The $Fe_2O_3$ content must remain less than 0.5%, higher $Fe_2O_3$ contents possibly impairing, to an unacceptable extent, the colour of the products and the heat transfer in the process for manufacturing the yarns.

Within the context of the present invention, the presence of fluorine (expressed in the form of $F_2$), of $B_2O_3$ or of $Li_2O$ with contents greater than 0.5% (and preferably with contents of at least 0.7% by weight) is essential in order to obtain glasses which are easy to melt and which can be fiberized without any difficulty and with good yields in conventional plants used, for example, to fiberize E-glass compositions. This is because, for lower contents both of $F_2$ and of $B_2O_3$ and $Li_2O$, difficulties are observed in fiberizing at already very high temperatures and/or there is an unacceptable reduction in the rate of melting of the glass batch used to obtain the fibres according to the invention when this batch is melted under the same conditions as the melting conditions observed for the manufacture of E-glass fibres. The glasses according to the invention can thus be fiberized with a satisfactory yield under industrial operating conditions. Moreover, these glasses have a viscosity of $10^{2.5}$ poise (i.e. approximately 316 poise) at a temperature of between 1200 and 1380° C. (or even 1370° C.) and a viscosity of $10^3$ poise at a temperature of between 1110 and 1290° C., thereby allowing them to be transported through the channels of the furnaces without significant energy expenditure and allowing them to be used in conventional plants for fiberizing E glass. Consequently, and because of the reduced cost of the compositions according to the invention, the overall cost of producing the yarns according to the invention is advantageously decreased compared with the usual cost of producing E-glass yarns.

The respective amounts of $F_2$, of $B_2O_3$ and of $Li_2O$ also advantageously remain less than 2%, preferably less than 1.8% and particularly preferably less than 1.5% in order to avoid opacification defects in the glasses, significant problems in treating the smoke and the problems mentioned above associated with the high contents of alkali metal oxides, this limitation also allowing the desirable particularly cheap and easily processable glasses according to the invention to be obtained.

One or more other components (which differ from those already considered, i.e. different from $SiO_2$, $Al_2O_3$, CaO, MgO, $Na_2O$, $K_2O$, $Li_2O$, $B_2O_3$, $F_2$, $TiO_2$ and $Fe_2O_3$) may also be present, generally as impurities, in the composition according to the invention, the sum of the amounts of these other components remaining less than 1% (so as not to risk degrading the properties of the glasses) and preferably being less than 0.5%, the amount of each other component present generally not exceeding 0.5%.

The yarns according to the invention may thus be produced and used like E-glass yarns; they are furthermore much cheaper and have better resistance to hydrolytic attack than E-glass yarns.

One particularly advantageous embodiment according to the invention, offering a good compromise between the cost of the composition, the fiberizability of the glasses and the properties of the yarns obtained, is that in which the yarns have the composition defined by the limits hereinbelow, expressed in percentages by weight:

| | |
|---|---|
| $SiO_2$ | 58.5 to 61% |
| | (and preferably: |
| | 59 to 61%) |
| $Al_2O_3$ | 11 to 14% |
| CaO | 21 to 23% |
| MgO | 2 to 3.5% |
| $Na_2O + K_2O + Li_2O$ | 0.5 to 1.8% |
| $TiO_2$ | 0 to 1% |
| $Fe_2O_3$ | 0 to 0.4% |
| $B_2O_3$ | up to 1.8% |
| $F_2$ | up to 1.8% | this composition furthermore comprising at least 0.7% of at least one of the three components $F_2$, $B_2O_3$, $Li_2O$ and comprising less than 1% (preferably less than 0.5%) of other constituent(s).

Particularly advantageously, these yarns have, for example, the composition defined by the limits hereinbelow, expressed in percentages by weight:

| | |
|---|---|
| $SiO_2$ | 59.0 to 60.7% |
| | (and preferably: |
| | 59.5 to 60.7%) |
| $Al_2O_3$ | 12.2 to 13.5% |
| CaO | 21.6 to 22.6% |
| | (and preferably: |
| | 21.8 to 22.6%) |
| MgO | 2.2 to 3.1% |
| $Na_2O + K_2O + Li_2O$ | 0.6 to 1.4% |
| $TiO_2$ | 0 to 0.8% |
| $Fe_2O_3$ | 0 to 0.4% |
| $B_2O_3$ | up to 1.4% |
| $F_2$ | up to 1.4% | this composition furthermore comprising at least 0.7% of at least one of the three components $F_2$, $B_2O_3$, $Li_2O$ and comprising less than 1% (preferably less than 0.5%) of other constituent(s).

The glass yarns according to the invention are obtained from the glasses of the composition described above using the following process: a multiplicity of streams of molten glass are drawn, these flowing out of a multiplicity of orifices located at the base of one or more bushings, into the form of one or more bundles (or layers) of continuous filaments and then the filaments are combined into one or more yarns which are collected on a moving support. This may be a rotating support when the yarns are collected in the form of windings, or a support which moves translationally when the yarns are chopped by a device which also serves to draw them, or when the yarns are projected by a device serving to draw them so as to form a mat.

The yarns obtained, optionally after other conversion operations, may thus be in various forms, namely continuous yarns, chopped yarns, braids, tapes, mats, meshes, nets, veils (or other structures in which filaments constituting the yarns are dissociated and dispersed) etc., these yarns being composed of filaments whose diameter may range from 5 to 24 microns approximately.

The molten glass feeding the bushings is generally obtained from materials (or products or components) which are optionally pure materials (coming for example from the chemical industry) but which are most often natural materials, the latter sometimes comprising trace impurities, these raw materials (pure or natural) being mixed in appropriate amounts in order to obtain the desired composition, and then being melted. The temperature of the molten glass (and therefore its viscosity) is conventionally adjusted by the operator so as to allow the glass to be fiberized while in particular avoiding the problems of devitrification and so as to obtain the best possible quality of the glass yarns. Before they are combined in the form of yarns, the filaments are generally coated with a size composition (conventionally chosen depending in particular on the application or destination of the yarns) allowing them to be protected from abrasion and facilitating their subsequent association with materials to be reinforced.

According to a particularly advantageous process for manufacturing the yarns according to the invention, at least some of the raw materials used to produce the molten glass are waste (or "scraps") of glass yarns, preferably waste of reinforcing glass yarns, for example of glass yarns as defined according to the invention and/or of E-glass yarns. In the latter case, these are, for example, waste of yarns having the following composition, expressed in percentages by weight: $SiO_2$: 52–57%; $Al_2O_3$: 12–16%; CaO: 16–25%; MgO: 0–6%; $B_2O_3$: 5–13%, alkali metal oxides (essentially $Na_2O$ and/or $K_2O$) : 0–2% (it being possible for this composition also to comprise other component(s) in amounts not exceeding 1.5% for each other component), the yarns of this composition being in practice regarded as being E-glass yarns. Particularly surprisingly, waste of glass yarns, such as E-glass yarns, which pose recycling problems in the manufacture of E-glass yarns, are in this case completely reusable in the manufacture of glass yarns according to the invention. They may be reintroduced without any difficulty into the batch of raw materials which is used to produce the molten glass, the amounts of the other raw materials used (generally natural and/or pure raw materials) being readjusted in order to obtain the composition as defined according to the invention. Likewise, waste of yarns as defined according to the invention may be used and/or optionally waste of other reinforcing glass yarns. The waste of glass yarns generally come from the reject yarns which are not wound (or not collected on translationally moving supports) recovered from under the bushings for manufacturing the glass yarns but they may also come from the product-finishing scraps obtained (cut edges of mats, ends of wound packages, etc.), these reject yarns and this product-finishing scraps optionally being treated (for example, heat treated) so as to remove, where necessary, the size with which they are coated and being ground so as to have, where required, a particle size comparable to that of the other raw materials used for producing the yarns according to the invention.

Preferably, the amount of waste of glass yarns present in the batch of raw materials which is melted to obtain the molten glass of the composition according to the invention represents from 0 to 35% by weight of the batch, particularly preferably it is between 0 and 25% by weight of the batch and particularly advantageously it constitutes from 5 to 20% by weight of the batch. The process using waste of glass yarns is particularly economic and makes it possible to obtain, in accordance with the invention, even more advantageous manufacturing costs.

The composites obtained from the yarns according to the invention comprise at least one organic material and/or at least one inorganic material and comprise glass yarns, at least some of the yarns being the glass yarns according to the invention. optionally, the glass yarns according to the invention may already have been combined (for example during drawing) with filaments of organic material so as to obtain composite yarns. By extension, "glass yarns whose composition comprises . . . " should be understood to mean, according to the invention, "yarns formed from glass filaments whose composition comprises . . . ", the glass filaments being optionally combined with organic filaments before the filaments are combined into yarns.

The advantages provided by the glass yarns according to the invention will be better appreciated through the following examples which illustrate the present invention without, however, limiting it.

EXAMPLE 1

In this example, glass yarns composed of 14 μm diameter glass filaments are obtained by drawing a molten glass, the glass having the following composition, expressed in percentages by weight:

| | |
|---|---|
| $SiO_2$ | 60.18 |
| $Al_2O_3$ | 13.00% |
| CaO | 22.00% |
| MgO | 2.43% |
| $Na_2O$ | 0.65% |
| $K_2O$ | 0.30% |
| $TiO_2$ | 0.11% |
| $Fe_2O_3$ | 0.16% |
| SrO | 0.02% |
| $F_2$ | 1.15% |

This glass has a viscosity of $10^{2.5}$ poise at a temperature of 1341° C. and a viscosity of $10^3$ poise at a temperature of 1255° C. It also has a liquidus temperature of 1180° C. The above viscosity and temperatures are measured using methods well known to those skilled in the art.

This glass also allows a saving to be made of at least 30% in the cost of the raw materials and of its production compared with a conventional E-glass composition. Furthermore, it is easy to melt and may be fiberized on conventional E-glass fiberizing plants.

EXAMPLE 2

In this example, glass yarns composed of 14 μm diameter glass filaments are obtained by drawing a molten glass, the glass having the following composition, expressed in percentages by weight:

| | |
|---|---|
| $SiO_2$ | 60.82% |
| $Al_2O_3$ | 11.70% |
| CaO | 21.20% |
| MgO | 2.80% |
| $Na_2O$ | 1.10% |
| $K_2O$ | 0.30% |
| $TiO_2$ | 0.10% |
| $Fe_2O_3$ | 0.16% |
| SrO | 0.02% |
| $B_2O_3$ | 1.80% |

This glass has a viscosity of $10^{2.5}$ poise at a temperature of 1351° C. and a viscosity of $10^3$ poise at a temperature of 1262° C. It also has a liquidus temperature of 1180° C.

This glass is much cheaper than a conventional E glass; it is easy to melt and may be fiberized on conventional E-glass fiberizing plants.

COMPARATIVE EXAMPLE

In this example, glass yarns composed of 14 μm diameter glass filaments are obtained by drawing a molten glass, the glass having the following composition expressed in percentages by weight:

| | |
|---|---|
| $SiO_2$ | 60.80% |
| $Al_2O_3$ | 12.70% |
| CaO | 21.50% |
| MgO | 3.20% |
| $Na_2O$ | 0.45% |
| $K_2O$ | 0.10% |
| $TiO_2$ | 0.50% |
| $Fe_2O_3$ | 0.30% |
| $B_2O_3$ | 0.45% |

This glass has a viscosity of $10^{2.5}$ poise at a temperature of 1382° C. It also has a liquidus temperature of 1200° C.

Such a glass is much more viscous than the glasses of the previous examples at a given temperature and requires much higher fiberizing temperatures. In fact, it appears that this glass cannot be easily fiberized on conventional E-glass fiberizing plants and requires specific plants allowing higher fiberizing temperatures. In addition, this glass is much more difficult to melt than the glasses of the previous examples under the same conditions.

The glass yarns according to the invention are advantageously suitable for all the usual applications of conventional E-glass yarns.

What is claimed is:

1. Reinforcing glass yarn, having a composition which comprises the following constituents, expressed in percentages by weight:

| | |
|---|---|
| $SiO_2$ | 58 to 62% |
| $Al_2O_3$ | 10 to 16% |
| CaO | more than 18% |
| MgO | more than 1.5% |
| CaO + MgO | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | the composition furthermore comprising less than 1% of other constituent(s) and comprising more than 0.5% of at least one of the three components $F_2$, $B_2O_3$ and $Li_2O$.

2. Glass yarn according to claim 1, wherein the glass forming the yarn has a viscosity of $10^{2.5}$ poise at a temperature of between 1200 and 1380° C. and a viscosity of $10^3$ poise at a temperature of between 1110 and 1290° C.

3. Glass yarn according to claim 1, wherein the sum of the CaO and MgO contents is greater than 21% by weight, the CaO and MgO contents not exceeding 26 and 10% by weight, respectively.

4. Glass yarn according to claim 1, wherein the composition comprises, expressed in percentages by weight:

| | |
|---|---|
| $SiO_2$ | 58.5 to 61% |
| $Al_2O_3$ | 11 to 14% |
| CaO | 21 to 23% |
| MgO | 2 to 3.5% |
| $Na_2O + K_2O + Li_2O$ | 0.5 to 1.8% |
| $TiO_2$ | 0 to 1% |
| $Fe_2O_3$ | 0 to 0.4% |
| $B_2O_3$ | up to 1.8% |
| $F_2$ | up ta 1.8% | the composition furthermore comprising at least 0.7% of at least one of the three components $F_2$, $B_2O_3$, $Li_2O$ and comprising less than 1% of other constituent(s).

5. Composite made of glass yarns defined by claim 1 and at least one organic or inorganic material.

6. Process for manufacturing glass yarns as defined in claim 1 comprising drawing a multiplicity of streams of molten glass flowing out of a multiplicity of orifices located at a base of one or more bushings, to form one or more bundles of continuous filaments, and combining the filaments into one or more yarns which are collected on a moving support.

7. Process according to claim 6, wherein the molten glass is obtained from raw materials, at least some of the said raw materials being waste of glass yarns.

8. Process according to claim 7, characterized in that the waste is waste of E glass yarns and/or is waste of a glass yarn which comprises the following constituents, expressed in percentages by weight:

| | |
|---|---|
| $SiO_2$ | 58 to 62% |
| $Al_2O_3$ | 10 to 16% |
| CaO | more than 18% |
| MgO | more than 1.5% |
| CaO + MgO | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% |

9. Process according to claim 7, wherein the waste represents from 0 to 35% by weight of the raw materials.

10. Glass composition adapted for making glass yarns used in reinforcement comprising the following constituents, expressed in percentages by weight:

| | |
|---|---|
| $SiO_2$ | 58 to 62% |
| $Al_2O_3$ | 10 to 16% |
| CaO | more than 18% |
| MgO | more than 1.5% |
| CaO + MgO | less than 28% |
| $Na_2O + K_2O + Li_2O$ | less than 2% |
| $TiO_2$ | less than 1.5% |
| $Fe_2O_3$ | less than 0.5% |
| $B_2O_3$ | less than 2% |
| $F_2$ | less than 2% | the composition furthermore comprising less than 1% of other constituent(s) and comprising more than 0.5% of at least one of the three components $F_2$, $B_2O_3$ and $Li_2O$.

* * * * *

UNITED STATES PATENT AND TRADEMARK OFFICE
CERTIFICATE OF CORRECTION

PATENT NO. : 6,136,735

DATED : October 24, 2000

INVENTOR(S): Marcelo Hernan Gallo, et al.

It is certified that an error appears in the above-identified patent and that said Letters Patent is hereby corrected as shown below:

On the title page, Item [30], the Foreign Application Priority Data has been omitted. Item [30] should read as follows:

[30]  Foreign Application Priority Data

Sep. 10, 1997  [FR]  France ............................ 97/11251

Signed and Sealed this

Fifteenth Day of May, 2001

*Attest:*

NICHOLAS P. GODICI

*Attesting Officer*  *Acting Director of the United States Patent and Trademark Office*